United States Patent [19]
Andriash et al.

[11] Patent Number: 5,550,346
[45] Date of Patent: Aug. 27, 1996

[54] LASER SHEET PERFORATOR

[76] Inventors: Myke D. Andriash, 88 Rockland Road, Campbell River, British Columbia, Canada, V9W 1N3; John Keightley, 24327-46A Avenue, Langley, British Columbia, Canada, V3A 4R1

[21] Appl. No.: 262,976

[22] Filed: Jun. 21, 1994

(Under 37 CFR 1.47)

[51] Int. Cl.⁶ .................................................. B23K 26/08
[52] U.S. Cl. ............................. 219/121.72; 219/121.71; 219/121.7; 219/121.94; 219/121.8; 83/16
[58] Field of Search ..................... 219/121.85, 121.72, 219/121.67, 121.7, 121.71, 121.8, 121.79, 121.82, 121.74; 83/428, 16, 43

[56] References Cited

U.S. PATENT DOCUMENTS

| | | |
|---|---|---|
| 3,226,527 | 12/1965 | Harding ................................ 219/121 L |
| 3,761,675 | 9/1973 | Mason et al. ......................... 219/121 L |
| 4,039,799 | 8/1977 | Stumpf ................................ 219/121.64 |
| 4,049,945 | 9/1977 | Ehlscheid et al. ................... 219/121.85 |
| 4,973,819 | 11/1990 | Thatcher ............................. 219/121.75 |
| 5,089,683 | 2/1992 | Stevenson et al. ................. 219/121.78 |

*Primary Examiner*—Mark H. Paschall
*Attorney, Agent, or Firm*—Nixon & Vanderhye

[57] ABSTRACT

An apparatus for cutting perforations in sheet material with a laser which includes a laser and servo motor controlled rotatable mirrors for focussing and directing a laser beam from the laser onto the sheet material so as to cut a perforation therein. An arm mounts the mirrors for movement of the beam from one perforating position to another. The laser is also shut off when moving from one perforation position to another. A perforation pattern is thus produced over a selected portion of the sheet.

21 Claims, 3 Drawing Sheets

SIMPLE ONE LINE

TWO HOLES PER LINE

THREE HOLES PER LINE

LASER SHEET PERFORATOR

FIELD

The present invention relates to a laser apparatus for making a regular array of perforations or holes in a sheet material.

BACKGROUND

It has recently become known that perforated sheet with an image and/or reflective surface on one side is a highly attractive advertising medium. Such material is transparent from one side while its image can be seen from the other side provided the level of illumination is greater on the image side of the sheet. Previously, painted dots over a transparent sheet material were used to create the equivalent effect as disclosed in U.K. Patent Application No. 2,118,096 A by Hill et al. and U.S. Pat. No. 4,673,609 issued to Hill. Obviously, the placement of such dots of about 1.0 mm in diameter with a spacing of 1.4 mm between centers requires precise registration and involves special masks. Hill '609 does mention punching, burning, and laser cutting to obtain the perforations but discloses no techniques by which laser cutting can be achieved.

The conventional methods of making perforations in plastic sheet material is to first make a die of a desired pattern and then to punch the material with this die over the surface of the material. In order to cover a large sheet material with holes it is necessary either to make a very large and expensive die or to punch the material several times. Multiple punching requires careful alignment of the sheet material before each punching step. Any slight misalignment becomes highly visible in the final product.

A second disadvantage is that not all material is amenable to being punched. For example, there are highly reflective materials which have tiny glass beads on their surface that would prevent mechanical perforation or dull the dies used to make these perforations. A second problem faced by mechanical dies is their tendency to become clogged with glue when perforating vinyl. Unfortunately, most commonly available vinyls have glue on one side. One possibility of overcoming the problem which are present for mechanical dies is to utilize a laser to perforate sheet material. It is known to cut holes in metal plate using lasers. However, obviously powerful lasers are required to accomplish such a task. For purposes of cutting through sheet material lower power lasers would be adequate but the cost of a laser powerful enough to burn through a variety of different sheet material of different thicknesses with a hole of a varying diameter as required for different purposes would still be relatively expensive.

SUMMARY OF THE INVENTION

According to the invention there is provided an apparatus for cutting perforations in sheet material with a laser which includes a laser, means for focusing and directing a laser beam from the laser onto the sheet material so as to cut a perforation therein, and means for moving said laser beam from one perforating position to another. Means are also provided for shutting off the laser beam when moving from the one perforation position to the other. A perforation pattern is thus produced over a selected portion of the sheet.

The laser beam moving means may include a movable arm movable along a first direction and reflecting and collimating means for directing the laser beam along the first direction proximate the arm so as to be reflected onto the sheet.

The laser beam moving means may also include a pair of mirrors rotatable about orthogonal axes mounted to the arm and reflecting and collimating means for directing the laser beam along the first direction so as to be reflected off of the first mirror onto the second mirror and then onto the sheet.

Servo motors may be coupled to the first and second mirrors to rotate them so as to direct the beam over the sheet material so as to traverse a desired path.

Preferably there are included means for moving the sheet material in discrete steps perpendicular to the first direction of movement.

Means are provided for adjusting the spacing between the holes and the rows.

The rotating means may be a pair of galvanometer servo motors to which the first and second mirrors, respectively, are mounted.

The reflecting and collimating means are a series of spaced apart mirrors and lenses between the laser and the mirrors which direct the laser beam parallel to the arm before it impinges on the first mirror.

The moving means may be a servo motor driving the arm and a processor coupled to the servo motor.

In another aspect of the invention there is provided a method of forming an array of perforations in sheet material which includes perforating with a laser holes along a row and step-wise moving the sheet material along a second direction orthogonal to the row once the perforations along the row are complete.

Preferably, after completion of each row the next row is started by reversing the direction of movement of the arm.

Advantageously, each hole is formed by moving the beam in a circle. Rather than perforating one hole at a time in a single row, two or more rows may be perforated with the sheet material in a fixed position on the bed by perforating a hole in one row and then moving the beam to the next row and perforating a hole in that row and then moving the beam back to the one hole and repeating the perforation pattern until both rows are completed after which the sheet material may be moved in a step-wise manner and the perforation process continued until the sheet is fully perforated. Multiple head and optical systems may be added in a like manner to speed the rate of perforation of a sheet material.

BRIEF DESCRIPTION OF THE DRAWINGS

The novel features believed characteristic of the invention are set forth in the appended claims. The invention itself, as well as other features and advantages thereof, will be best understood by reference to the description which follows read in conjunction with the accompanying drawings, wherein:

DETAILED DESCRIPTION WITH REFERENCE TO THE DRAWINGS

Figure 1:
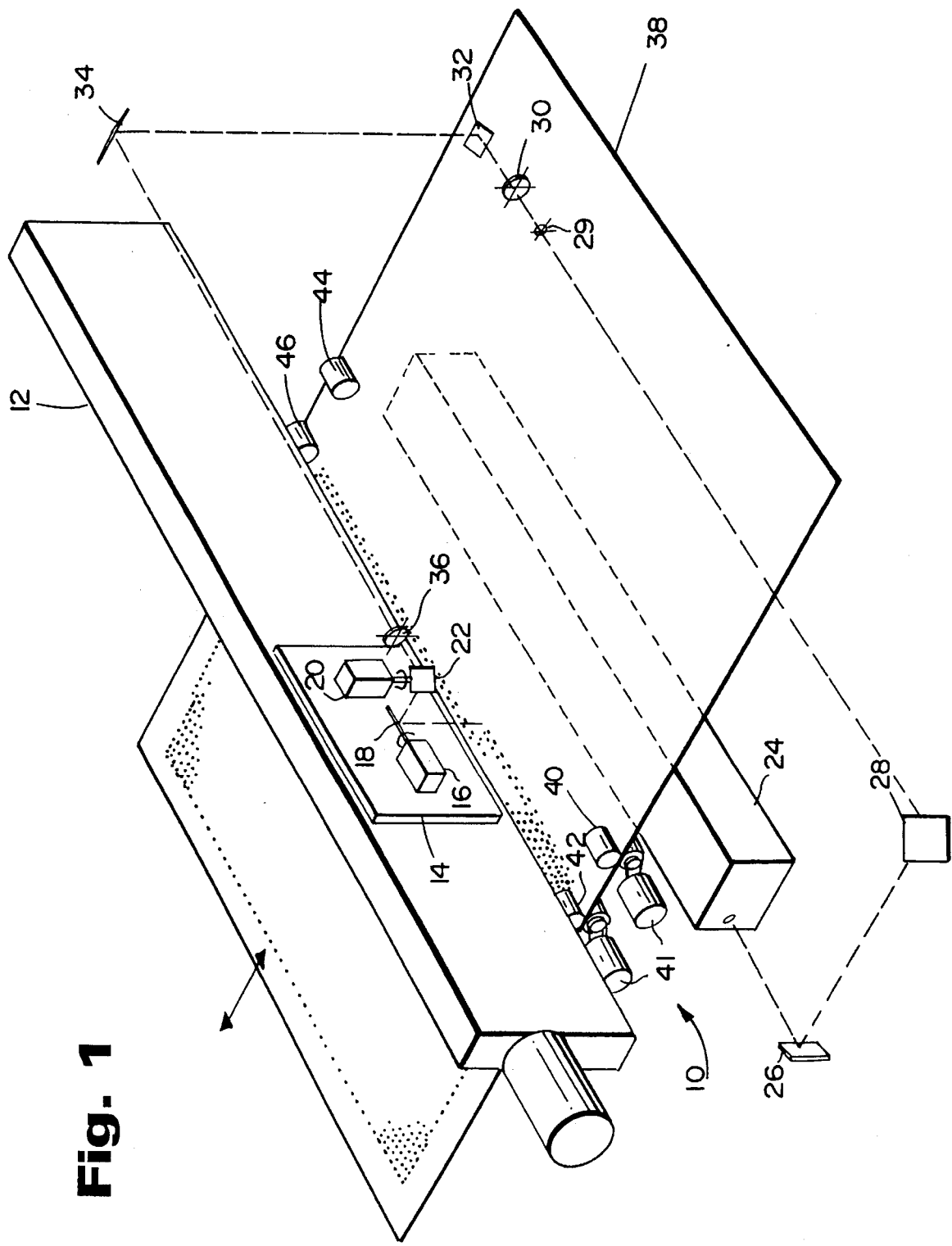
FIG. 1 is an isometric view of the laser perforating apparatus.

Referring to FIG. 1 the laser perforating apparatus shown has a horizontally disposed bed 48 equipped with a roller assembly 10 made up of rollers 40, 42, 44 and 46 for engaging a sheet material 38 and moving it step-wise across the bed 48. Positioned above bed 48 is an elongated arm 12 carrying a galvanometer mounting plate 14 to which galvanometer servo motors 16 and 20 are fastened. Galvanometer servo motors 16 and 20 consist of a rotatable coil of wire (not shown) suspended in a magnetic field with a rotary encoder affixed to the coil. Alternatively, the galvanometer servo motor may also be of a type having a magnet suspended in a coil of wire with the encoder attached to the magnet. Arm 12 is driven by an arm servo 11. A planar mirror 18 is attached to galvanometer servo motor 16 and is driven rotationally thereby. Similarly, a planar mirror 22 is attached to galvanometer servo motor 20 and drives the former rotationally. The axis of rotation of mirror 22 is vertical while that of mirror 18 is horizontal and along the direction of movement of arm 12.

A carbon dioxide laser 24 shown positioned below bed 48 emits a beam which is reflected by mirrors 26 and 28 onto lenses 29 and 30 which expand the diameter of the beam to the desired size and also collimate the beam. The beam is further reflected by mirrors 32 and 34 parallel to arm 12, through focusing mirror 36 and onto mirror 22. From mirror 22 the beam is reflected onto mirror 18 and down onto sheet 38. It will be appreciated that mirror 22 controls movement of the beam in the direction of movement of arm 12 while mirror 18 moves the beam along the direction of movement of sheet 38. Lens 36 can be positioned as shown or, alternatively, in a horizontal attitude below mirror 18 to maximize the distance between the media and the final optical element. By moving the optical elements up and away from the cutting point one avoids contamination of these by cutting debris.

Figure 2:
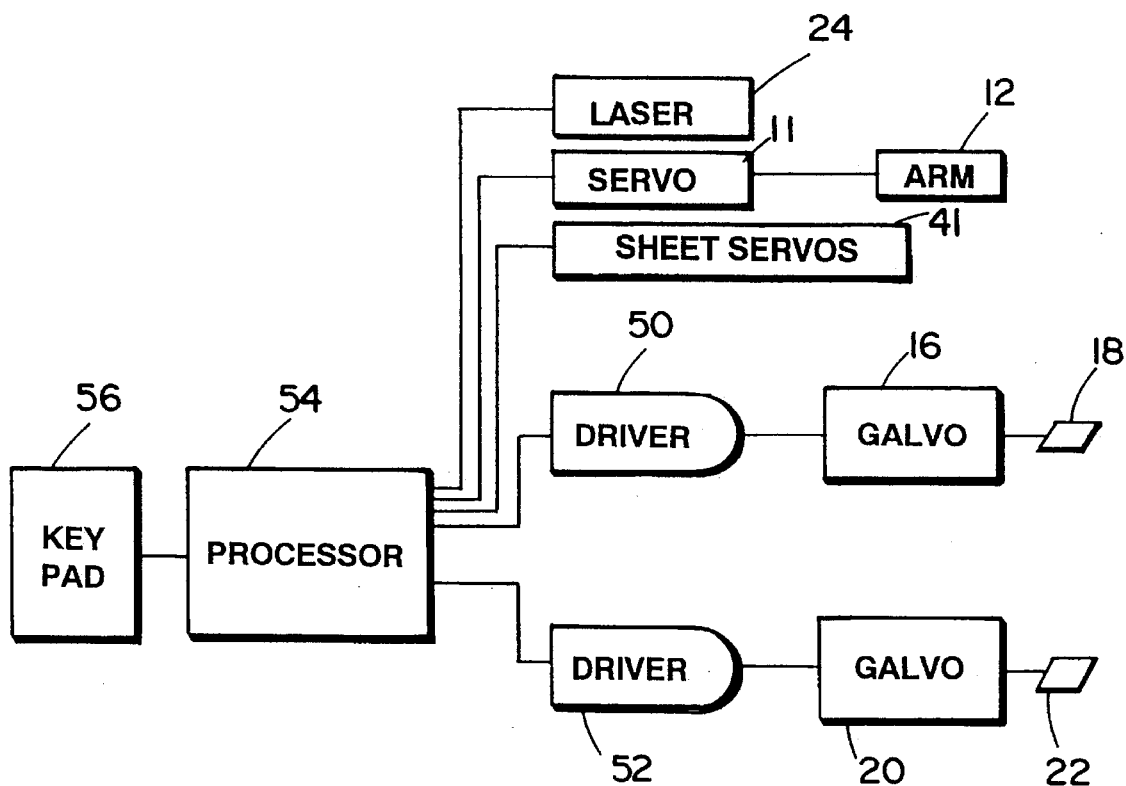
FIG. 2 is a schematic view of the electronic control circuit for the galvanometers, laser, sliding arm and sheet moving servos.

Referring to FIG. 2 the electronic control circuit for the galvanometer servo motors 16 and 20, the sheet servos 41, the arm 12 and the laser 24 is shown as consisting of drivers 50 and 52 which drive the galvanometer servo motors 16 and 20. A processor 54 which receives input instructions from keypad 56 provides the driving signal to drivers 50 and 52 an ON/OFF signal to control the output of laser 24, the rotation of a lead screw (not shown) which drives the arm 12 and the movement of sheet servos 41. Depending upon the driving signals various hole patterns can be achieved. The spacing between holes may be adjusted by varying software parameters of processor 54 to vary the speed of movement of arm 12 and the movement of the galvanometer servo motors 16 and 20. Some of these hole patterns are seen in FIGS. 3, 4, and 5.

Figure 3:
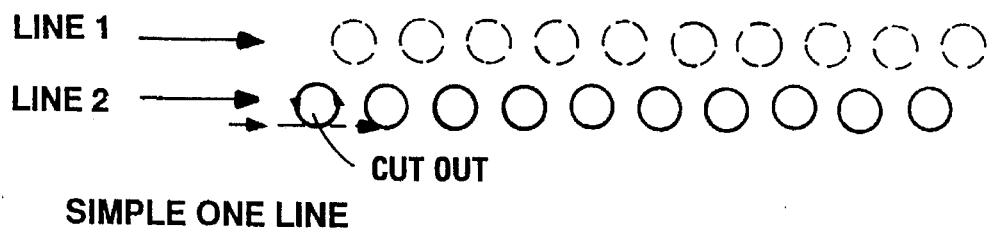
FIG. 3 is a plan view showing the movement of the laser beam along a single row.

As seen in FIG. 3 each hole is cut out in a circular fashion so that the volume of material that has to be burned away by the laser is minimized thereby reducing the smoke and charring of the material. The arm 12 is moved continuously as the beam traces around first one hole and then the next. The movement of the galvanometer servo motors compensates for the motion of the arm 12 to produce the desired circles or other patterns. After each hole is traced, the laser beam is shut off while the galvanometers move to position the beam when ON at the position of the next hole to be traced and then it is switched ON again and the next hole is cut. The process is repeated until an entire row of holes is formed across the width of the sheet material 38. Then the roller assembly 10 moves the sheet material 38 a precise distance across the bed to the position where the next row of holes is to be formed and the perforation process is repeated one line at time.

Figure 4:
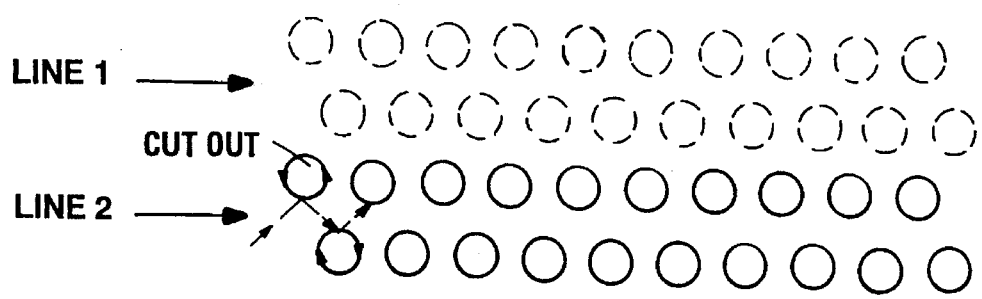
FIG. 4 is a plan view showing the movement of the laser beam along two rows at a time.

As seen in FIG. 4, two rows of holes are formed at one position of the sheet material 38, thereby minimizing the number of incremental moves of sheet 38 over bed 48. A hole from one row is cut and after completion the beam is shut off while arm 12 is moving continuously. The mirrors 18 and 22 move the beam to an adjacent row at which point the beam is switched back on and caused to describe a circle so as to cut out the next hole. The mirrors 18 and 22 cause the beam to return to its original position while roller assembly 10 moves the sheet incrementally to a next position wherein the entire perforation procedure is repeated.

Figure 5:
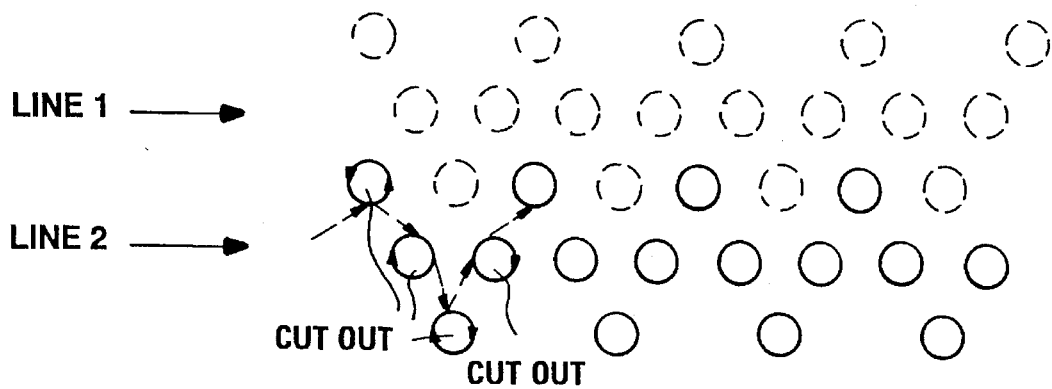
FIG. 5 is a plan view showing the movement of the laser beam along three rows at a time.

As seen in FIG. 5 three holes at a time can be perforated as shown. Unlike the pattern in FIG. 4, rather than returning to the original position after completing three holes, the mirrors reverse the beam and cause it to perforate a hole in the middle row and then one in the first row as shown.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modification or embodiments as fall within the true scope of the invention.

I claim:

1. An apparatus for cutting perforations in sheet material with a laser, comprising:
   (a) a bed for supporting the sheet material;
   (b) a laser operative to provide a laser beam of sufficient intensity to cut through the sheet material supported by said bed;
   (c) an arm movable across said bed;
   (d) means for moving said arm at a selected speed;
   (e) means for reflecting and collimating said beam so that said beam is incident on said sheet;
   (f) means for moving said sheet over said bed transverse to the direction of movement of said arm;
   (g) said reflecting and collimating means including first and second mirrors rotatable about orthogonal axes mounted on said arm;
   (h) means for rotating said first and second mirrors so that said beam traverses a closed path over said sheet to define each perforation, at each of a plurality of spaced apart locations along said sheet so as to produce an array of perforations in said sheet; and
   (i) means for shutting off said laser between perforations.

2. Apparatus according to claim 1, wherein said rotating means comprise a pair of galvanometer servo motors to which said first and second mirrors are respectively, mounted and which mirrors rotate in response to operation of said servo motors.

3. Apparatus according to claim 1, wherein said reflecting and collimating means comprise a series of spaced apart mirrors and lenses between said laser and said mirrors which direct the laser beam parallel to said arm before it impinges on said first mirror.

4. Apparatus according to claim 1, wherein said moving means is a servo motor driving said arm and a processor coupled to said servo motor.

5. Apparatus according to claim 1, including means for adjusting the rate and extent of rotation of said mirrors so as to vary the spacing between holes and the size and shape of the holes.

6. Apparatus according to claim 5, wherein said adjusting means includes a processor for controlling the movement of said mirrors and a software program for said processor having variable input parameters for controlling the rate and extent of rotation of said mirrors.

7. Apparatus according to claim 1 including a focussing lens carried by said arm and disposed between said first and second mirrors on the one hand and the bed on the other hand for focussing the beam from said first and second mirrors onto the sheet material on said bed.

8. An apparatus for cutting perforations in sheet material with a laser, comprising:

(a) a bed for supporting the sheet material;

(b) a laser operative to provide a laser beam of sufficient intensity to cut through the sheet material supported by said bed;

(c) an arm movable across said bed and a drive for moving said arm across said bed;

(d) first and second galvanometer servo motors affixed to said arm;

(e) first and second mirrors rotatably attached to said first and second galvanometer servo motors, respectively, and positioned so as to move the laser beam, incident on said first mirror and reflected from said first mirror onto said second mirror onto said sheet, in two dimensions over said sheet;

(f) a drive for moving said sheet over said bed transverse to the direction of movement of said arm;

(g) a signal source for driving said first and second galvanometer servo motors so that said laser beam traverses a closed path on said sheet to define each perforation at each of a plurality of spaced apart locations along said sheet so as to produce an array of perforations in said sheet; and (h) means for shutting off said laser between perforations.

9. Apparatus according to claim 8, wherein said drive for said arm continuously moves said arm across said bed.

10. Apparatus according to claim 8, including means for controlling the laser beam output power so that it can be adjusted for different materials.

11. Apparatus according to claim 8, including means for compensating the position of said galvanometers for continuous movement of said arm.

12. Apparatus according to claim 11, wherein said drive for said arm includes a servo motor for driving said arm, said compensating means including a processor which also provides signals to drive said servo motor for said arm.

13. Apparatus according to claim 10, wherein said controlling means comprises a processor, said processor being coupled to said first and second galvanometer servo motors to control the rate and extent of rotation of said first and second mirrors so as to adjust the spacing between and the size and shape of the perforations.

14. A method of forming an array of perforations in sheet material, comprising the steps of:

(a) traversing a laser beam along a closed path on said sheet material to cut through the sheet material and define a discrete perforation therethrough;

(b) changing the relative position of the sheet material and the position of impingement of the laser beam on the sheet material; and (c) after step (b), continuously repeating steps (a) and (b) to define additional discrete perforations through the sheet material spaced one from another to provide an array of perforations through the sheet material.

15. A method according to claim 14 herein steps (a), (b) and (c) are performed to form an aligned linearly extending row of perforations through the sheet material.

16. A method according to claim 15 wherein said laser beam is shut off after forming each discrete perforation.

17. A method according to claim 15 including forming a second row of perforations through the sheet material generally parallel to the first-mentioned row of perforations while the sheet material is in a fixed position on the bed.

18. A method according to claim 15 including forming a second row of perforations through the sheet material generally parallel to the first-mentioned row of perforations, said sheet material being perforated by forming a discrete perforation in said first-mentioned row, shutting off the laser beam, moving the beam to the second row, turning the laser beam back on and forming a discrete perforation in the second row and then moving the beam back to said first row and forming a next discrete perforation in said first row and repeating the sequence of alternately forming discrete perforations in said first and second rows until both first and second rows are completed, moving said sheet material in a stepwise manner relative to the position of the laser beam and repeating the perforation forming process until the sheet or a selected portion thereof is fully perforated.

19. A method according to claim 14 wherein the step of traversing includes displacing the laser beam to form a circle on the sheet material for each discrete perforation, thereby forming circular perforations.

20. A method according to claim 19 including a pair of orthogonally related rotatable mirrors for reflecting the laser beam from a laser beam source for impingement on the sheet material and wherein the step of traversing includes rotating the mirrors in synchronism with one another to displace the laser beam to form the circle on the sheet material.

21. A method according to claim 14 including moving the sheet material in a second direction orthogonal to the row once the perforations along the row are complete.

* * * * *